Nov. 9, 1965 M. A. TABET 3,217,104
TRANSFER SWITCHING SYSTEM
Filed Nov. 28, 1961
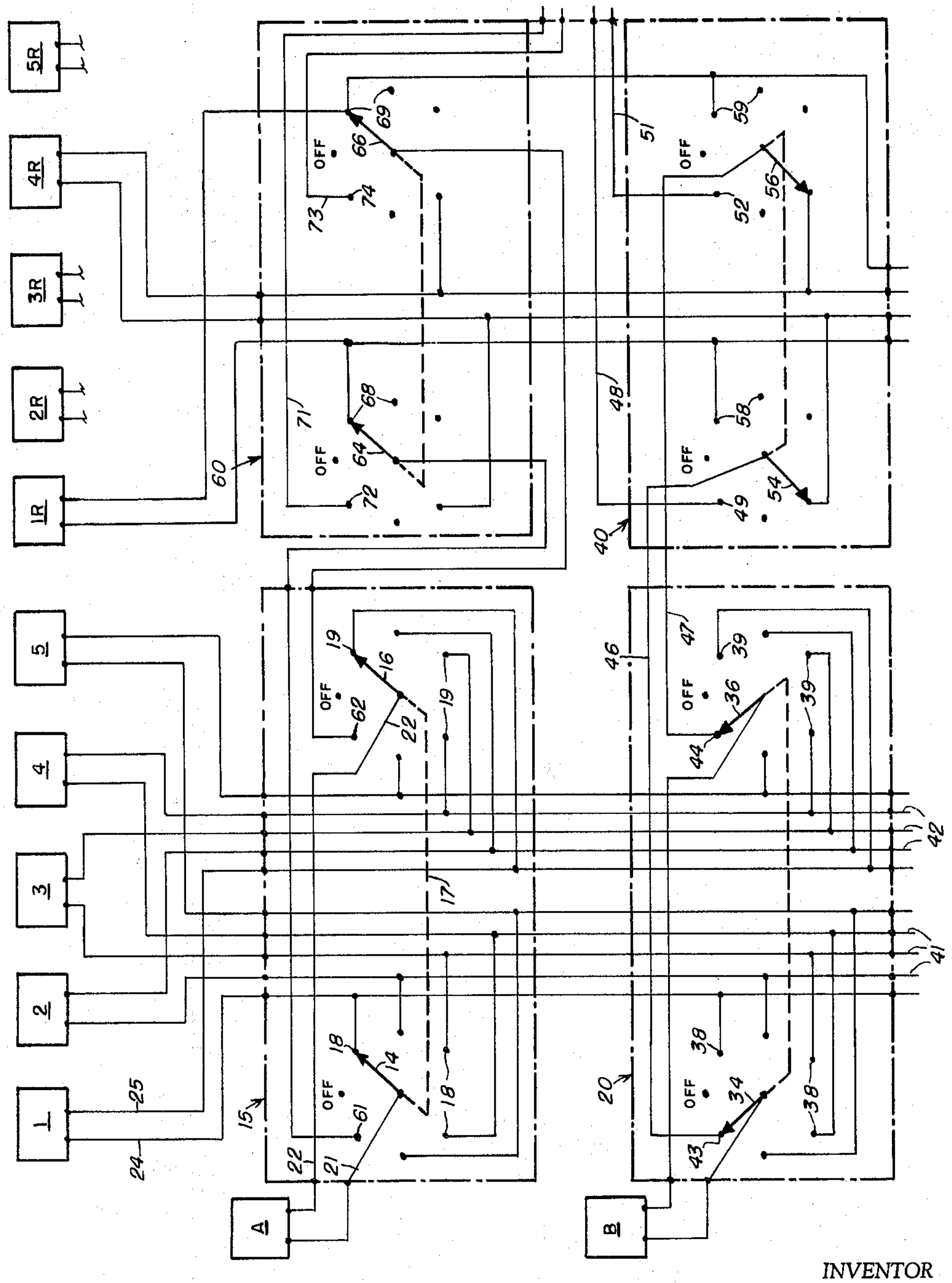
INVENTOR
MICHAEL A. TABET
BY [signature]
ATTORNEY United States Patent Office
3,217,104
Patented Nov. 9, 1965

3,217,104
TRANSFER SWITCHING SYSTEM

Michael A. Tabet, 1336 Ballentine Blvd., Norfolk, Va.
Filed Nov. 28, 1961, Ser. No. 155,316
2 Claims. (Cl. 179—1)

The present invention relates to an electrical switching system including switches and circuits therefor for transferring the output of any one of a plurality of electrical operating units to any one or more remotely located utilization stations and the invention more specifically pertains to a system for connecting the output of any one of a number of receivers to one or a plurality of or all of a number of listening stations.

The invention has particular utility in association with communication centers such as those employed for emergency purposes wherein a plurality of receivers are each tuned to a different transmitter signal and the output of the receivers are transferred to one or more listening stations. The invention is particularly useful with communication system employed on board shops such as naval vessels whereby the output of any one or a plurality of receivers is to be transferred to any one or all of the listening stations.

Such switching equipment has been in use in the past and includes a multitude of switches each having a blade, which engages and disengages a contact. The prior system employing such components requires ten switches each having two circuit making contacts for transferring the output of five receivers to either of two listening stations or fifty switches for shifting the output of five receivers to ten listening stations. Such prior switching equipment when devoid of a mechanical interlocking mechanism has no means for avoiding paralleling of the output circuits of the receivers so that it was possible in operation of such equipment for the output of more than one receiver to be connected to one listening station resulting in confusion and loss of intelligence. Inadvertent paralleling of the output of the receivers frequently occurred because of the multitude of control knobs required by the prior arrangement.

An object of the invention is to provide switches of such character in association with the circuits therefor for shifting the output of any one of a plurality of receiver units to any one or more of a group of listening stations and to a switching system for by-passing any switching mechanism so that the output of any one of another group of receivers may be connected through the by-passed switch mechanism to a given listening station and to a system making it impossible for the output of any two or more of the receivers to be connected in parallel relationship and thereby avoid impressing the audio of more than one of the receivers on the equipment at a listening station.

Other objects and features of the invention will be appreciated and become more apparent particularly to those skilled in the signalling art as the present disclosure proceeds and upon consideration of the accompanying drawing and the following detailed description wherein an embodiment of the invention is disclosed.

The drawing is a schematic diagram illustrating switches and circuits therefor providing a switching system embodying the invention.

The present invention is directed to a system for selectively shifting the output of any one of a plurality of electrical units such as radio receivers to one or more utilization stations or listening stations which may be arranged at different locations on a ship or in a communication system. One listening station is indicated at A in the drawing while another is indicated at B. The listening stations may be located remotely of the receivers and each listening station may be provided with utilization equipment such as ear phones or speakers.

There is shown at 1–2–3–4–5 a first group of receivers each having an output circuit. A switch indicated generally at 15 is provided for selectively connecting the output circuit of any one of this group of receivers to the listening station A without the possibility of the output of more than one of these receivers being connected to the equipment at the listening station A at any one instant. A switch mechanism indicated generally at 20 provides for selectively connecting the output of any one of the first group of receivers to the listening station B. The switch assembly 15 is provided with means for bypassing the receivers making up the first group and conditioning the system for connecting the listening station A to any one of another group of receivers. The switch mechanism 20 is provided with means bypassing the receivers in the first group and providing circuits therethrough for connecting the listening station B to any one of another group of receivers.

The switch assembly 15 includes two wiper blades one of which is indicated at 14 and another at 16 which are mechanically connected by means indicated at 17 so as to move in unison by means of a knob. The wiper blade 14 is adapted to selectively engage any one of a plurality of circumferentially spaced contacts 18. The wiper blade 16 is adapted to selectively engage any one of circumferentially spaced contacts 19.

A conductor 21 extends from the wiper blade 14 to the listening station A. A conductor 22 extends from the wiper blade 16 to the listening station A. One conductor 24 of the receiver 1 is connected to the number one contact 18. The conductor 25 of the receiver 1 is connected to the number one contact 19. Thus when the wiper blades 14 and 16 are turned to the position illustrated and respectively engaging the number one contacts of the switch mechanism 15 the output of the receiver 1 is connected to the listening station A.

The output of any one of the receivers in the first group may be connected to the listening station A by the switch mechanism 15 by rotating the wiper blades 14 and 16. Any one of the receivers such as 1 is disconnected from the station A before the output circuit of another of the receivers in the first group is connected to the station A. The output of the receiver 4 for example is connected to the station A by swinging the wiper blades 14 and 16 to engage the number four contacts 18 and 19 of the switch mechanism 15. All of the receivers in the first group are disconnected from the listening station A when the wiper blades 14 and 16 are in the "Off" position.

The output of any one of the receivers making up the first group may be connected to the listening station B by swinging the wiper blades 34 and 36 of the switch mechanism 20. When the blade 34 engages the number three contact 38 and the wiper blade 36 engages the number three contact 39 the output of the receiver 3 is applied to the station B. The wiper blades 34 and 36 of the switch assembly 20 may be arranged at any one of five operative positions so that the output of any one of the receivers in the first group is connected to the station B. The output of the receiver 1 may be connected to the station B while this receiver is also connected to the station A through the switch mechanism 15. When the wiper blades 34 and 36 move from engagement with one contact of the associated set they disconnect that receiver from the station B and thereby prevent the output of more than one of the receivers from being applied to the listening station. The switch mechanism 20 has five operative positions and is capable of shifting the output of any one of the five receivers to the station B. The conductors forming the output circuits of the first group of receivers may extend as indicated at 41 and 42 for connection to the circumferentially spaced contacts of additional switch mechanisms of the type shown at 15 and 20 for applying the output of any one of the receivers in this group to additional listening stations.

The contacts of each switch mechanism and the circuits therefor provide for connecting the output of any one of a second group of radio receivers indicated at 1R–2R–3R–4R–5R to any one or all of the listening stations. The switch mechanism 20 is provided with a contact 43 adapted to be engaged by the wiper blade 34 and a contact 44 to be engaged by the wiper blade 36. When these wiper blades are in the position illustrated the output of all of the receivers in the first group are disconnected from the listening station B. A conductor 46 extends from the contact 43 to the wiper blade 54 of a switch mechanism 40 and a conductor 47 extends from the contact 44 to the wiper blade 56 of the switch mechanism 40. When the wiper arms 54 and 56 are in the number four position depicted in the drawing the output of the receiver 4R is connected to the listening station B. A conductor 48 extends from a transfer contact 49 and a conductor 51 extends from the transfer contact 52 of the switch assembly 40 for connection to an additional switch mechanism and to the wiper blades thereof for selectively connecting additional receivers to the station B. The wiper arms 54 and 56 may be turned to respectively engage contacts 58 and 59 and selectively apply the output of any one of the five receivers in the second group to the listening station B.

The output of any one of the receivers in the second group may be connected to the listening station A when the wiper blade 14 engages the transfer contact 61 and the wiper blade 16 engages the transfer contact 62 of the switch mechanism 15. Under such circumstances the listening station A is disconnected from the output of all of the first group of receivers. The wiper arms 64 and 66 of a switch mechanism 60 when engaging the number one contacts 68 and 69 provide connection of the output of the receiver 1R to the listening station A. The output of any one of the other receivers in the second group may likewise be connected to the listening station A. A conductor 71 extends from a transfer contact 72 of the switch assembly 60 and a conductor 73 extends from a transfer contact 74 for connection to the wiper blades of an additional switch for selectively applying the output of additional receivers to the station A.

While the invention has been described with regard to switch assemblies and circuits therefor for transferring the output of receivers to listening stations the switching system may be employed in association with any type of network wherein the output of various types of electrical units are to be applied to utilization stations. The number of contacts on each switch mechanism may be varied in number so that the system may serve to transfer the output of a number of devices to any one or all of the utilization stations. Such modifications and others may be made without departing from the spirit and scope of the invention as set forth in the appended claims.

What I claim and desire to secure by Letters Patent is:

1. An electrical switching system for selectively connecting any one of a plurality of groups of operating units to a utilization station comprising, a first group of operating units, a utilization station, a switch assembly having a first set of circumferentially spaced contacts arranged over one sector and a second set of circumferentially spaced contacts arranged over said sector, a first transfer contact associated with said first set of contacts and a second transfer contact associated with said second set of contacts, a first wiper blade for selectively engaging any one contact of said first set of contacts and the first transfer contact, a second wiper blade for selectively engaging any one contact of said second set of contacts and said second transfer contact, means for moving said first and second wiper blades in unison, conductors extending from said utilization station respectively to said first and second wiper blades, a second group of operating units, another switch assembly having a third set of circumferentially spaced contacts and a fourth set of circumferentially spaced contacts, a third wiper blade for selectively engaging any one contact of said third set of contacts, a fourth wiper blade for selectively engaging any one contact of said fourth set of contacts, means for moving said third and fourth wiper blades in unison, a conductor extending from each operating unit of the first group to one contact of the first set of contacts, another conductor extending from each operating unit of the first group to one contact of the second set of contacts, a conductor extending from each operating unit of the second group to one contact of the third set of contacts, a conductor extending from each operating unit of the second group to one contact of the fourth set of contacts, a conductor extending from the first transfer contact to the third wiper blade, and a conductor extending from the second transfer contact to the fourth wiper blade.

2. An electrical switching system for selectively connecting any one of a plurality of groups of operating units to a utilization station according to claim 1 wherein the transfer contacts are respectively located outside the sector occupied by said first and second sets of contacts.

References Cited by the Examiner

UNITED STATES PATENTS

| | | | |
|---|---|---|---|
| 2,243,575 | 5/41 | Ono et al. | 307—115 |
| 2,398,576 | 4/46 | Bowsher | 340—147 |
| 2,794,081 | 1/55 | Luhn | 200—14 |

OTHER REFERENCES

"4-Station Radio System—Plus Talk-Back Feature," Radio-Craft magazine, July 1939, pages 28, 29, and 49.

ROBERT H. ROSE, *Primary Examiner.*

NEIL C. READ, *Examiner.*